(12) United States Patent
Shahar

(10) Patent No.: US 11,196,599 B2
(45) Date of Patent: Dec. 7, 2021

(54) SYSTEM AND METHOD FOR PER FRAME OVERHEAD REDUCTION IN AIR INTERFACE FOR OFDMA SYSTEMS

(71) Applicant: Full Spectrum Inc., Sunnyvale, CA (US)

(72) Inventor: Menashe Shahar, Los Altos, CA (US)

(73) Assignee: Ondas Networks Inc., Sunnyvale, CA (US)

( * ) Notice: Subject to any disclaimer, the term of this patent is extended or adjusted under 35 U.S.C. 154(b) by 449 days.

(21) Appl. No.: 15/394,185

(22) Filed: Dec. 29, 2016

(65) Prior Publication Data

US 2017/0195101 A1  Jul. 6, 2017

Related U.S. Application Data

(60) Provisional application No. 62/273,214, filed on Dec. 30, 2015.

(51) Int. Cl.
| | |
|---|---|
| H04L 5/00 | (2006.01) |
| H04J 13/18 | (2011.01) |
| H04W 28/02 | (2009.01) |
| H04W 72/04 | (2009.01) |
| H04L 27/26 | (2006.01) |
| H04L 1/00 | (2006.01) |

(52) U.S. Cl.
CPC ............ *H04L 27/26* (2013.01); *H04L 1/0079* (2013.01); *H04L 1/0008* (2013.01); *H04L 5/0091* (2013.01); *H04W 28/0205* (2013.01)

(58) Field of Classification Search
CPC ... H04L 1/0079; H04L 5/0053; H04L 5/0046; H04L 5/0019; H04L 1/0008; H04L 27/26; H04L 5/0091; H04W 28/0205
USPC ........................................................ 370/330
See application file for complete search history.

(56) References Cited

U.S. PATENT DOCUMENTS

| | | | |
|---|---|---|---|
| 8,160,163 B1 * | 4/2012 | Yucek | H04W 16/14 375/246 |
| 2005/0232181 A1 * | 10/2005 | Park | H04L 5/0007 370/319 |
| 2007/0060149 A1 * | 3/2007 | Lim | H04W 28/06 455/445 |
| 2008/0108355 A1 * | 5/2008 | Oleszcsuk | H04W 72/1263 455/442 |
| 2009/0040970 A1 * | 2/2009 | Ahmadi | H04B 7/2612 370/329 |
| 2009/0316806 A1 * | 12/2009 | Cheng | H04L 5/0007 375/260 |
| 2010/0208655 A1 * | 8/2010 | Kim | H04L 1/0079 370/328 |
| 2011/0164586 A1 * | 7/2011 | Kim | H04W 28/06 370/329 |
| 2013/0121274 A1 * | 5/2013 | Chen | H04L 5/0053 370/329 |

* cited by examiner

*Primary Examiner* — Gbemileke J Onamuti
(74) *Attorney, Agent, or Firm* — Pearl Cohen Zedek Latzer Baratz LLP

(57) ABSTRACT

An OFDMA system having a reduced overhead, particularly suitable for narrow bandwidth systems, in which uplink and downlink map messages have reduced length for efficiency.

11 Claims, 1 Drawing Sheet

| HT (1) | LEN (7) | HCS(8) |
|---|---|---|

| HT (1) | EC(1) | Type (6) | ESF(1) | CI(1) | EKS(2) | Rsv(1) | LEN MSB(3) |
|---|---|---|---|---|---|---|---|
| LEN LSB (8) | | | CID MSB (8) | | | | |
| CID LSB (8) | | | HCS (8) | | | | |

Fig. 1 (Prior Art)

| LEN (8) | HCS (8) |
|---|---|

Fig. 2

| HT (1) | LEN (7) | HCS(8) |
|---|---|---|

Fig. 3

SYSTEM AND METHOD FOR PER FRAME OVERHEAD REDUCTION IN AIR INTERFACE FOR OFDMA SYSTEMS

CROSS-REFERENCE TO RELATED APPLICATIONS

This application claims benefit of and priority to U.S. Provisional Patent Application No. 62/273,214, filed on Dec. 30, 2015, the entire contents of which are herein incorporated by reference in its entirety.

FIELD OF THE INVENTION

The present invention relates generally to wireless networks, and in particular to a method and system for reducing per-frame overhead in the air interface for orthogonal frequency division multiple access (OFDMA) systems.

BACKGROUND OF THE INVENTION

According to OFDMA systems, for example, systems complying with an IEEE 802.16 or LTE standard, a base station (BS) may control allocation of frequency and/or time resources for use in both uplink and downlink directions for communication with remote stations (RS). Generally, the BS may communicate the allocations by periodically transmitting to the RSs resource allocations, designating which slots, i.e., a two dimensional structure defined by sub-channels and OFDMA symbols each RS may use in the uplink direction and which slots in the downlink direction carry data for this RS. These resource allocations are transmitted in the form of an uplink map (ULMAP) and downlink map (DLMAP) MAC messages.

For example, according to the IEEE 802.16 standard, the MAC layer overhead may include several components, e.g., preamble, downlink map (DLMAP), uplink map (ULMAP) and other MAC messages. While the DLMAP and ULMAP are not the only components of MAC overhead, they are the most dominant due to their length and their transmission rate (once per TDD frame).

The DLMAP message, which may be transmitted in the beginning of each TDD frame, describes the burst allocations in the current downlink sub-frame. According to the IEEE 802.16 standard, the downlink MAP message is structured as a IEEE 802.16 protocol data unit (PDU), i.e., it has a Generic MAC (GMAC) header and cyclic redundancy check (CRC) with the same structure as a data PDU. The payload of the downlink MAP message includes a number of information elements, one information element per downlink modulation and forward correction scheme (referred to as "FEC Code") used in the current frame. The number of slots reserved for the downlink MAP is static, i.e., the bandwidth allocated to the downlink MAP at every frame is configured statically and does not depend on the actual traffic. As such, the length of the downlink MAP message is determined by the worst case scenario. Moreover, given that the downlink MAP needs to be received by all RSs in the sector, the downlink MAP employs the most robust FEC Code available and as a result, requires a relatively large number of overhead slots.

According to the IEEE 802.16 standard protocol, the ULMAP message may be transmitted after the downlink MAP in each TDD frame. The ULMAP message describes the burst allocation for the uplink sub-frame of the next frame. As with the downlink MAP message, the uplink MAP is structured as an IEEE 802.16 PDU, i.e., it includes a GMAC header and CRC. Unlike the downlink MAP, the number of slots allocated to uplink MAP is dynamic and depends on the uplink traffic.

SUMMARY OF EMBODIMENTS OF THE INVENTION

Embodiments of the invention provide for a system, apparatus and method for reduced overhead communication. According to embodiments of the invention, a base station (or processor operating instructions stored thereon) may transmit to remote stations in communication with the base station reduced-length downlink and uplink map messages, wherein the length of a header of said reduced-length uplink and downlink map message is no more than 16 bits.

According to further embodiments of the invention, the reduced-length downlink map message may include a header consisting essentially of a length field and a header check sequence (HCS).

According to yet further embodiments of the invention, the reduced-length uplink map message may include a header consisting essentially of a first bit indication of whether an uplink map message follows, a length field, and a header check sequence (HCS).

According to embodiments of the invention, the reduced-length uplink and downlink map messages may each include a cyclic redundancy check (CRC) field comprising no more than 8 bits.

According to embodiments of the invention, the reduced-length downlink map message may comprise one bandwidth allocation information element (IE) per each modulation and forward error correction scheme ("FEC Code") used in this DLSF. The IE may have no more than 8 bits, and may identify a two dimensional allocation by indicating the number of slots in the allocation.

According to embodiments of the invention, the reduced-length uplink map message may include a data burst information element (IE), wherein the data burst IE consists essentially of a connection identifier (CID) having no more than 16 bits, an uplink interval usage code (UIUC) having no more than 4 bits, and a duration having no more than 10 bits.

According to embodiments of the invention, the reduced-length uplink map message may include a CDMA allocation information element (IE), wherein the CDMA allocation IE consists essentially of an uplink interval usage code (UIUC) having no more than 4 bits, a duration having no more than 4 bits, a frame number index having no more than 4 bits, a ranging code having no more than 8 bits, and a bandwidth request mandatory indication code.

According to embodiments of the invention, the reduced-length uplink map message may include a power control information element (IE), wherein the power control IE consists essentially of a connection identifier (CID) having no more than 16 bits, an uplink interval usage code (UIUC) having no more than 4 bits, and a power control field having no more than 8 bits.

According to embodiments of the invention, the reduced-length downlink map may include a media access control (MAC) management message (MMM) consisting essentially of a frame number having no more than 16 bits.

According to embodiments of the invention, the reduced-length uplink map may not include a media access control (MAC) management message (MMM).

According to embodiments of the invention, there may be provided an OFDMA system comprising a processor for use in a base station, said processor configured to transmit to remote stations in communication with the base station reduced-length downlink and uplink map messages, wherein the length of a header of said reduced-length uplink and downlink map message is no more than 16 bits, wherein the channel bandwidth for the OFDMA system is less than or equal to 1.25 MHz.

According to further embodiments of the invention, the per-frame bandwidth required for transmitting the reduced-length downlink and uplink map messages may be less than or equal to approximately 10% of the channel bandwidth.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 depicts a GMAC header according to the prior art IEEE 802.16 standard;

FIG. 2 depicts a reduced GMAC header in a downlink map message according to embodiments of the present invention; and FIG. 3 depicts a reduced GMAC header in an uplink map message according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

In the descriptions that follow, embodiments of the invention are described in connection with an orthogonal frequency division multiple access (OFDMA) system, such as used in IEEE 802.16 and LTE standards. However, it will be recognized that the present invention may be used in a variety of Point to Multipoint Broadband Wireless Systems in which a base station allocates uplink and downlink resources to a plurality of remote stations.

The uplink and downlink resource allocations may be transmitted in non-data carrying slots in the downlink subframe of every frame, for example, bearing the ULMAP and DLMAP structures, each of which contain a plurality of fields. These DLMAP and ULMAP structures carry various Information Elements (IEs) to inform RSs about resource allocation of time and frequency for each given RS in the downlink and uplink directions, respectively. The bandwidth required for communicating this non-data system information is referred to as per-frame overhead.

In OFDMA systems compliant with the IEEE 802.16 specifications for media access control (MAC) layer, the bandwidth required for transmission of ULMAP or DLMAP messages, i.e., the MAC layer overhead, may be substantial, particularly in systems with narrow bandwidth. More specifically, where a system has wide channel bandwidth (e.g., 5 MHz and above), the overhead may represent an acceptably small portion of the overall bandwidth. However, for narrow band systems (e.g., for channel bandwidth between 100 kHz and 1.25 MHz), using the ULMAP and DLMAP dictated by IEEE 802.16 would require a MAC layer overhead that leaves little bandwidth for data transmission, thereby impairing system performance (e.g., data rate). According to some embodiments of the invention, there are provided modified structures for reducing MAC layer overhead in a narrow bandwidth system, e.g., to less than or equal to approximately 10% of the channel bandwidth. Embodiments of the invention may be used in conjunction with amendments of the IEEE 802.16 standard.

Downlink and uplink MAP messages are typically transmitted by the base station using the most robust modulation and coding scheme (QPSK ½), in order to ensure reliable reception by all remote stations in the sector. Unless the conditions in the network are such that a higher modulation for these messages can be use reliably, the per-frame overhead may be on the order of 20 slots. Depending on TDD frame configuration, the per-frame overhead may consume a significant percentage of the frame. For example, if standard IEEE 802.16 is used with 128 FFT, a 1.25 MHz wide channel (sampling clock frequency=1.4 MHz) a cyclic prefix=⅛ (i.e., number of samples per symbol=144) and a 10 ms frame duration the maximum number of OFDMA symbols per TDD frame 97. If for frequency reuse consideration, a single PUSC sub-channel is used per sector in both downlink and uplink direction and assuming downlink: uplink ratio is 49:48, the number of slots per downlink/uplink subframe is 24/16. This will leave just 4 slots for data transport in the downlink direction, resulting in very poor throughput.

Reduction of the percentage overhead can be accomplished by increasing the duration of the TDD frame but this may result in increased latency which may not be tolerated by the application.

According to embodiments of the invention, the system may use modified ULMAP and DLMAP structures having reduced size, thereby increasing efficiency without adversely affecting system performance.

According to one embodiment of the invention, the ULMAP or DLMAP may have a modified header. According to the standard, the GMAC header is 6 bytes long. According to embodiments of the invention, the header may be reduced to 2 bytes by omitting well-known of fixed value fields and unused fields. Thus, for example, a GMAC header according to the IEEE 802.16 standard includes the following fields: header type (HT), encryption (EC), type, extended sub-header (ESF), CI, EKS, and connection identifier (CID). The standard GMAC header is shown in FIG. 1, where the number in brackets indicates the respective field size in bits. This structure is used in both the DLMAP and ULMAP.

According to embodiments of the invention, MAP message structures may be reduced by one or more of the following techniques: (a) eliminating transmission of information known to the RS, (b) removing unwanted bits from the IEs, (c) encoding dynamically changing information in IEs using the minimum number of bits, (d) changing the allocation definition in the DLMAP as in the ULMAP, where only the numbers of slots are conveyed in IEs; the BS and RS may identify allocation geometry (time and frequency) by traversing first in frequency and then time for a given frame configuration, (e) reducing GMAC header to minimum size for MAP messages, (f) reducing CRC size, as these modified messages may typically result in less than 64 bytes.

According to embodiments of the invention, it is possible to reduce the size of DLMAP and ULMAP messages so that more downlink resources are available for data traffic for a given frame length. This can be done by reducing the size of IEs and still carrying the required information, by reducing size of GMAC and CRC and by avoiding regular interval DCD/UDC messages.

Thus, for example, according to embodiments of the invention, the header may be modified to omit header type (always zero), EC (always encrypted), type (not used), ESF (never used in DLMAP), CI (CRC always present), EKS (always non-encrypted), and CID (always broadcast).

FIG. 2 is a schematic illustration of a DLMAP GMAC header structure according to embodiments of the present invention. The DLMAP is generally the first burst in the downlink sub-frame (DLSF), so it may be identified as a DLMAP without further header information, and the CID indication is not required by the receiver to identify the structure as such. According to embodiments of the invention, the GMAC header may consist of 1 byte for a length field and 1 byte for a header check sequence (HCS) field.

According to the standard, the CID information element indicates whether the DLMAP includes CID information or not. According to embodiments of the invention, the CID is not included in the MAP, thereby saving 12 bits. It will be noted that the CID is included in the data PDU header.

FIG. 3 is a schematic illustration of a ULMAP GMAC header structure according to embodiments of the present invention. The ULMAP, if present, is generally the next burst in the downlink sub-frame (DLSF) after the DLMAP; however, it may not always be present in a frame. If the DLMAP is not present, the burst after the DLMAP may carry data traffic. According to embodiments of the invention, the ULMAP may use first bit HT=1 as to identify the burst as ULMAP. The modified ULMAP according to embodiments of the invention may have 7 bits reserved for ULMAP length indication, as it cannot exceed 128 bytes. Next, the header may include 1 byte for an HCS field.

Because the standard specifies 32-bit CRC for a PDU, the DLMAP and ULMAP are generally transmitted with a 32-bit CRC. According to embodiments of the invention, the DLMAP and ULMAP may have a reduced CRC, commensurate to the reduced size of the MAP messages. For example, in embodiments of the invention in which the DLMAP may not exceed 256 bytes, and the ULMAP may not exceed 128 bytes, an 8-bit CRC may be used, and will suffice to protect the short PDU size.

The DLMAP may be modified in other ways in accordance with embodiments of the present invention. For example, the rectangular burst geometry required by the standard may be replaced by linear slot allocation. More specifically, the rectangular DL bursts according to the IEEE 802.16 standard may be replaced with linear DL bursts according to embodiments of the invention. The number of slots per DL burst may be transmitted in the DLMAP IE. Slot allocation per burst may be continuous by traversing first in frequency, and then in time, for a given frame configuration. With linear DLMAP structure according to embodiments of the invention, the first slot of the next burst may be identified by the last slot of the previous burst. The number of slots per burst may therefore be sufficient to define the architecture of the burst, since it is linear, not rectangular.

According to embodiments of the invention, the downlink map message may include one information element (IE) per modulation and forward error correction scheme ("NEC Code") providing bandwidth allocation for all downlink PDUs employing this PEE code, within the current downlink sub-frame. The IE may identify the boundary of the respective two dimensional allocation by indicating the number of slots in the allocation using an 8-bit number. According to embodiments of the invention, it may be implied that the two-dimensional allocation starts at the next slot after the last slot of the previous allocation, and that subsequent slots are allocated in a linear order with frequency first and time second, i.e., the order of slot allocation goes from the lowest to the highest frequency at the same time and then, jumps from the highest frequency to the lowest frequency of the next time instant.

According to embodiments of the invention, the CID information is omitted from the DLMAP message. Thus, unlike transmissions according to the standard, in which CID information is always broadcast, in embodiments of the invention, the remote station PHY layer may be required to decode all downlink bursts. That is, the filtering of downlink PDUs of interest to a specific remote station is performed by the MAC layer based on the CID in the data PDU GMAC header.

According to an embodiment of the invention, the DLMAP message may consist of only a DIUC and an indication of the number of slots per burst. The DIUC may be 4 bits, as in the standard, and the number of slots per burst may be an 8-bit number. It will be recognized that the standard does not provide for including the number of slots per burst in the DLMAP.

According to embodiment of the invention, many fields in the standard DLMAP IE may be dropped, including: The CIDs may be dropped, and similarly, the number of CIDs in the burst (N_CID) may be dropped because the CIDs are not transmitted in the DLMAP. In addition, various fields are no longer required, due to the geometry change in the DLMAP IE, including the symbol offset; the sub-channel offset; number of symbols; and number of sub-channels. Next, the boosting field may be dropped, insofar as the use of per-burst boosting may be avoided in embodiments of the invention.

Finally, the repetition field may be dropped, because an unused DIUC value is employed to identify QPSK½ with repetition 2. Due to the high overhead, repetition 4 and 6 should not be used in narrow channels.

According to embodiments of the invention, there may also be provided a modified or reduced ULMAP IE structure, relative to the ULMAP IE according to the standard.

Generally, according to the standard, Initial Ranging/Handover Ranging (IR/HR) and Periodic Ranging/Bandwidth Request (PR/BR) IEs are used to identify the regions in the uplink sub-frame (ULSF) allocated for IR/HR and PR/BR CDMA code transmission. For 128 FFT, IR/HR and PR/BR extends over a full channel. According to embodiments of the invention, IR and PR IEs may be constructed in accordance with one or more of the following rules. First, IR/HR and PR/BR allocations may extend over a fixed number of OFDMA symbols (e.g., 3 symbols @1 MHz wide channel). Next, IR/HR and PR/BR are not allocated at the same frame. Further, IR/HR and PR/BR are always allocated as the first burst in the ULSF. Finally, IR/HR may be identified by uplink interval usage code (UIUC)=12, and PR/BR may be identified by URIC=10. With the above rules according to embodiments of the invention, there is no longer a need to identify the geometry of IR/HR and PR/BR bursts.

Accordingly, the only fields retained in the IR/PR IE may be a 4-bit URIC. Accordingly, numerous fields may be dropped in accordance with embodiments of the invention. For example, since the transmission of geometry information is no longer required, there is no need to transmit: OFDMA symbol offset, sub-channel offset, number of symbols, and number of sub-channels.

In addition, according to the standard, for ranging method, the value 0b00 indicates 2 symbol initial/handover ranging, while the value 0b10 indicates 1 symbol periodic/BR ranging. According to embodiments of the invention, this is indicated by separate UIUC, so may be dropped. Similarly, according to the standard, the ranging indicator having a value 0b0 indicates normal ranging, while the value 0b1 indicates dedicated ranging. Again, this may be dropped in embodiments of the invention, as only normal ranging may be used. Finally, as for CID, IR and PR bursts are always transmitted using broadcast CID.

Embodiments of the invention may allow for an uplink data burst indicated by URIC=1 to 8. In particular, the UL data burst geometry may be defined by the "duration" field, which contains the number of slots in the burst. Slots allocation per burst is continuous by traversing first in time and then in frequency for a given frame configuration. According to embodiments of the invention, the repetition field may be dropped, and a new URIC value may be added for QPSK ½ with repetition 2. Accordingly, the modified data burst IE includes: CID (16 bits); URIC (4 bits); Duration (10 bits).

Embodiments of the invention may allow for identifying CDMA parameters identified by UIUC=14. In particular, the CDMA-ALLOC IE identifies the region in the ULSF in which a remote station should transmit a ranging message. Accordingly, embodiments of the present invention may use a modified CDMA-ALLOC IE, containing the following fields: UIUC (4 bits); Duration (4 bits may suffice, insofar as this is usually 9 slots); Frame Number Index (4 bits) to indicate the frame number in which the CDMA code to which this message responds was transmitted; Ranging Code (8 bits) to indicate ranging code sent by the remote, and BW request mandatory (1-bit) to indicate whether the remote shall include a BR in the allocation. According to embodiments of the invention, the CDMA-ALLOC IE may drop or otherwise omit ranging symbol and ranging sub channel, as these are well-known, and need not be transmitted.

Embodiments of the invention may allow for transmitting power control information, identified by UIUC=9. In particular, the power control IE according to the standard, which is carried in an extended UIUC may be replaced in embodiments of the invention with the unused UIUC value of 9. Embodiments of the invention may transmit a modified power control IE having CID (8 bits); UIUC (4 bits); and Power Control (8 bits) to indicate change in power level. According to embodiments of the invention, the Power Control IE may drop or otherwise omit extended UIUC; length; and power measurement frame.

According to embodiments of the invention, there may be a modified MAC management message (MMM) structure in the ULMAP and DLMAP.

According to some embodiments of the invention, the modified MMM in the DLMAP may include a 16-bit frame number field, reduced from the standard length of 24 bits. According to embodiment of the invention, many elements of the MMM may be omitted. For example, the DLMAP MMM structure may omit Management Message Type=2, because the DLMAP is always the second burst (after FCH) in the DLSF and it is carried in every frame. As such, it may be identified without the presence of the type field which therefore can be dropped. The Frame Duration Code may be omitted. This field normally conveys frame duration with which BS is transmitting. However, for a given deployment, this parameter is well known information, so need not be transmitted every frame and hence dropped. The DCD Count may be omitted, insofar as the DIUC to burst profile/FEC code mapping may be maintained static per deployment and as such, this parameter can be dropped from the DLMAP. The Base Station ID need not be transmitted. This information does not need to be carried in the DLMAP in every frame. Rather, the BS may transmit this information as an additional parameter in the registration response. Accordingly, the information is exchanged only during network entry, which should be sufficient. Finally, the Number Of OFDMA symbols may be dropped from the DLMAP. This field carries information about the total number of symbols in the DLSF. This information may change based on deployment, but is fixed for a given deployment. Accordingly, it may be configured upon initiation of the system, and need not be transmitted in the DLMAP.

According to some embodiments of the invention, there is no need for a MMM in the ULMAP. According to some embodiments of the invention, the following fields need not be transmitted in a ULMAP message: Management Message Type=3 need not be transmitted, because the ULMAP is always the third burst (after FCH and DLMAP) in the DLSF, and it is carried in every frame. As such, it can be identified without the presence of the type field which therefore can be dropped. The FDD Partition Flag may be omitted: this is an FDD-specific flag, and hence dropped in TDD systems. The UCD Count may be omitted, insofar as the URIC to burst profile/FEC code mapping may be maintained static per deployment. The Allocation Start Time may be omitted, insofar as the UL allocation start time is relative to start of frame, and is well-known at the remote. The Number Of OFDMA Symbols field carries information about total number of symbols in the ULSF. Again, this field may change per deployment, but is fixed for a given deployment; accordingly, the field may be statically configured at the remote, and need not be transmitted in a ULMAP.

It will be understood that the algorithms above are embodiments of the invention, and that the invention may be performed using similar techniques. Furthermore, although embodiments of the invention above have been described in connection with an IEEE 802.16 standard, other embodiments of the invention may be used in conjunction with other suitable wired or wireless networks, such as a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.16, 802.16d, 802.16e, 802.11a, 802.11b, 802.11g, 802.11n standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Single Input Single Output (SISO) transceiver, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time Division Multiple Access (TDMA), Extended TDMA (E-TDMA), General Packet Radio Service (GPRS), Extended GPRS, 3G systems (Code-Division Multiple Access (CDMA), Wideband CDMA (WCDMA), CDMA 2000), 4G systems (LTE, WiMAX) Interim Standard 95 (IS-95), Multi-Carrier Modulation (MCM), Discrete Multi-Tone (DMT), Bluetooth™, ZigBee™, or the like. Embodiments of the invention may be used in various other apparatuses, devices systems and/or networks.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A non-transient computer-readable medium for causing a processor of a base station in an OFDMA system to perform the method of reducing a size of a Media Access Control (MAC) layer message according to the IEEE 802.16 standard between the base station and the OFDMA system, the method comprising:
   transmit to remote stations in communication with the base station reduced-length downlink and uplink map MAC messages,
   wherein the length of a header of said reduced-length uplink and downlink map MAC message is no more than 16 bits and wherein the reduced-length downlink message includes a header consisting of a length field and a header check sequence (HCS).

2. The non-transient computer-readable medium according to claim 1, wherein the reduced-length uplink map message includes a header consisting essentially of a first bit indication of an uplink header, a length field, and a header check sequence (HCS).

3. The non-transient computer-readable medium according to claim 1, wherein the reduced-length uplink and downlink map messages each include a cyclic redundancy check (CRC) field comprising no more than 8 bits.

4. The non-transient computer-readable medium according to claim 1, wherein the reduced-length downlink map message comprises one bandwidth allocation information element (IE) per modulation and forward error correction scheme ("FEC Code") having no more than 8 bits, said bandwidth allocation IE identifying a two dimensional allocation by indicating the number of slots in the allocation.

5. The non-transient computer-readable medium according to claim 1, wherein the reduced-length uplink map message includes a data burst information element (IE), wherein the data burst IE consists essentially of a connection identifier (CID) having no more than 16 bits, an uplink interval usage code (UIUC) having no more than 4 bits, and a duration having no more than 10 bits.

6. The non-transient computer-readable medium according to claim 1, wherein the reduced-length uplink map message includes a CDMA allocation information element (IE), wherein the CDMA allocation IE consists essentially of an uplink interval usage code (UIUC) having no more than 4 bits, a duration having no more than 4 bits, a frame number index having no more than 4 bits, a ranging code having no more than 8 bits, and a bandwidth request mandatory indication code.

7. The non-transient computer-readable medium according to claim 1, wherein the reduced-length uplink map message includes a power control information element (IE), wherein the power control IE consists essentially of a connection identifier (CID) having no more than 16 bits, an uplink interval usage code (UIUC) having no more than 4 bits, and a power control field having no more than 8 bits.

8. The non-transient computer-readable medium according to claim 1, wherein the reduced-length downlink map includes a media access control (MAC) management message (MMM) consisting essentially of a frame number having no more than 16 bits.

9. The non-transient computer-readable medium according to claim 1, wherein the reduced-length uplink map does not include a media access control (MAC) management message (MMM).

10. A method of reducing a size of a Media Access Control (MAC) layer message according to the IEEE 802.16 standard between the base station and an OFDMA system, the method comprising:
   transmitting to remote stations in communication with the base station reduced-length downlink and uplink map MAC messages,
   wherein the length of a header of said reduced-length uplink and downlink map MAC message is no more than 16 bits, and wherein the reduced-length downlink message includes a header consisting of a length field and a header check sequence (HCS), and
   wherein a channel bandwidth for the OFDMA system is less than or equal to 1.25 MHz.

11. The method of claim 10, wherein a per-frame bandwidth required for transmitting the reduced-length downlink and uplink map messages is less than or equal to approximately 10% of the channel bandwidth.

* * * * *